(12) United States Patent
Parker et al.

(10) Patent No.: US 10,760,189 B2
(45) Date of Patent: Sep. 1, 2020

(54) PROTECTIVE FABRIC AND PROCESS OF MANUFACTURING SAME

(71) Applicant: General Recycled, Vancouver (CA)

(72) Inventors: Edward (Ted) Parker, Vancouver (CA); David Kasper, Langley (CA)

(73) Assignee: General Recycled

( * ) Notice: Subject to any disclaimer, the term of this patent is extended or adjusted under 35 U.S.C. 154(b) by 0 days.

(21) Appl. No.: 15/491,471

(22) Filed: Apr. 19, 2017

(65) Prior Publication Data

US 2017/0306534 A1    Oct. 26, 2017

Related U.S. Application Data

(60) Provisional application No. 62/326,497, filed on Apr. 22, 2016.

(51) Int. Cl.
| | |
|---|---|
| *D03D 15/12* | (2006.01) |
| *D01G 11/04* | (2006.01) |
| *D02G 3/04* | (2006.01) |
| *D02G 3/44* | (2006.01) |
| *D03D 15/00* | (2006.01) |

(52) U.S. Cl.
CPC .......... *D03D 15/12* (2013.01); *D01G 11/04* (2013.01); *D02G 3/045* (2013.01); *D02G 3/443* (2013.01); *D10B 2321/101* (2013.01); *D10B 2331/02* (2013.01); *D10B 2331/021* (2013.01); *Y02W 30/667* (2015.05)

(58) Field of Classification Search
CPC ........ D02G 3/443; D02G 3/047; D03D 15/12; D03D 13/008; D03D 15/0005; D03D 1/0041; A62B 17/003
See application file for complete search history.

(56) References Cited

U.S. PATENT DOCUMENTS

| | | | | |
|---|---|---|---|---|
| 6,743,498 | B2 * | 6/2004 | Fourmeux | A41D 31/08 428/131 |
| 6,790,795 | B2 * | 9/2004 | Erb, Jr. | B32B 5/26 442/35 |
| 7,043,943 | B2 * | 5/2006 | Koopmann | D04B 1/04 66/194 |
| 7,065,950 | B2 * | 6/2006 | Zhu | D02G 3/047 57/255 |
| 7,344,035 | B1 * | 3/2008 | Koopmann | D04B 1/04 210/503 |
| 7,348,059 | B2 * | 3/2008 | Zhu | D02G 3/047 428/357 |
| 7,744,999 | B2 * | 6/2010 | Zhu | D02G 3/047 2/458 |
| 8,069,642 | B2 * | 12/2011 | Zhu | D02G 3/047 57/255 |
| 8,069,643 | B2 * | 12/2011 | Zhu | D02G 3/443 57/255 |

(Continued)

*Primary Examiner* — Robert H Muromoto, Jr.
(74) *Attorney, Agent, or Firm* — McMillan LLP (57) ABSTRACT

A fabric for use in arc and flame protection, and a process for producing a fire resistant fabric are provided. The fabric is made from at least 70 weight percent (wt %) aramid fiber; less than 40 wt % modacrylic; 8 wt % nylon; and 2 wt % anti-static. The aramid fiber is made from recycled aramid fiber from recycled fire resistant garments, and virgin aramid fiber. The fabric may be used to produce fire-resistant garments worn by workers in many industries such as the oil and gas.

7 Claims, 14 Drawing Sheets

| Burn # | % of Total Mannequin Surface Reaching Criteria for 2nd & 3rd Degree Burn | | | % of Mannequin Surface Under Garment Reaching Criteria for 2nd & 3rd Degree Burn | | | After-flame (s) | Observations |
|---|---|---|---|---|---|---|---|---|
| | 2nd° | 3rd° | Total | 2nd° | 3rd° | Total | | |
| 4309³ | 8.50 | 8.30 | 16.80 | 9.9 | 0.0 | 9.9 | 3.3 | Full-body afterflame; moderate-heavy smoke; some discolouration, shrinking, and stiffening of fabric; some charring of fabric on sleeves and legs. |
| 4312³ | 4.95 | 8.30 | 13.25 | 6.3 | 0.0 | 6.3 | 2.6 | Afterflame on legs and torso; moderate-heavy smoke; some discolouration, shrinking, and stiffening of fabric; some charring of fabric on sleeves and legs. |
| 4314³ | 5.05 | 8.30 | 13.35 | 5.6 | 0.0 | 5.6 | 2.6 | Afterflame on legs and torso; moderate-heavy smoke; some discolouration, shrinking, and stiffening of fabric; some charring of fabric on sleeves and legs. |

(56) References Cited

U.S. PATENT DOCUMENTS

| | | | | |
|---|---|---|---|---|
| 8,133,584 B2* | 3/2012 | Zhu | D02G 3/047 | 428/373 |
| 8,732,863 B2* | 5/2014 | Hines | D02G 3/047 | 2/81 |
| 8,973,164 B2* | 3/2015 | Hines | D02G 3/047 | 2/81 |
| 9,169,582 B2* | 10/2015 | Zhu | D02G 3/443 | |
| 9,745,674 B2* | 8/2017 | Hines | D02G 3/443 | |
| 9,765,454 B2* | 9/2017 | Tutterow | D02G 3/443 | |
| 2002/0142132 A1* | 10/2002 | Fourmeux | A41D 31/08 | 428/138 |
| 2002/0182967 A1* | 12/2002 | Erb, Jr. | B32B 5/26 | 442/415 |
| 2005/0204487 A1* | 9/2005 | Zhu | D06P 3/8271 | 8/531 |
| 2005/0204718 A1* | 9/2005 | Zhu | D02G 3/047 | 57/255 |
| 2005/0274152 A1* | 12/2005 | Koopmann | D04B 1/04 | 66/194 |
| 2005/0287364 A1* | 12/2005 | Zhu | D02G 3/047 | 428/357 |
| 2010/0009186 A1* | 1/2010 | Zhu | D02G 3/047 | 428/395 |
| 2010/0299816 A1* | 12/2010 | Zhu | D02G 3/047 | 2/458 |
| 2010/0299817 A1* | 12/2010 | Zhu | D02G 3/443 | 2/458 |
| 2011/0138523 A1* | 6/2011 | Layson, Jr. | B32B 5/26 | 2/458 |
| 2011/0250810 A1* | 10/2011 | Zhu | D02G 3/047 | 442/311 |
| 2012/0159697 A1* | 6/2012 | Zhu | D02G 3/047 | 2/455 |
| 2013/0042385 A1* | 2/2013 | Hines | D02G 3/047 | 2/85 |
| 2013/0055491 A1* | 3/2013 | Zhu | D02G 3/443 | 2/458 |
| 2013/0267140 A1* | 10/2013 | Gstettner | D02G 3/047 | 442/302 |
| 2014/0026303 A1* | 1/2014 | Zhu | A62B 17/003 | 2/458 |
| 2014/0223650 A1* | 8/2014 | Hines | D02G 3/047 | 2/458 |
| 2015/0086758 A1* | 3/2015 | Tutterow | D02G 3/443 | 428/196 |
| 2015/0191856 A1* | 7/2015 | Hines | D02G 3/047 | 428/221 |
| 2017/0306534 A1* | 10/2017 | Parker | D03D 15/12 | |
| 2018/0002840 A1* | 1/2018 | Tutterow | D02G 3/443 | |
| 2018/0127899 A1* | 5/2018 | Tutterow | D02G 3/443 | |
| 2019/0186055 A1* | 6/2019 | O'Hara | D03D 15/08 | |

* cited by examiner

FIG. 1

| Burn # | % of Total Mannequin Surface Reaching Criteria for 2nd & 3rd Degree Burn | | | % of Mannequin Surface Under Garment Reaching Criteria for 2nd & 3rd Degree Burn | | | After-flame (s) | Observations |
|---|---|---|---|---|---|---|---|---|
| | 2nd° | 3rd° | Total | 2nd° | 3rd° | Total | | |
| 4309[3] | 8.50 | 8.30 | 16.80 | 9.9 | 0.0 | 9.9 | 3.3 | Full-body afterflame; moderate-heavy smoke; some discolouration, shrinking, and stiffening of fabric; some charring of fabric on sleeves and legs. |
| 4312[3] | 4.95 | 8.30 | 13.25 | 6.3 | 0.0 | 6.3 | 2.6 | Afterflame on legs and torso; moderate-heavy smoke; some discolouration, shrinking, and stiffening of fabric; some charring of fabric on sleeves and legs. |
| 4314[3] | 5.05 | 8.30 | 13.35 | 5.6 | 0.0 | 5.6 | 2.6 | Afterflame on legs and torso; moderate-heavy smoke; some discolouration, shrinking, and stiffening of fabric; some charring of fabric on sleeves and legs. |

FIG. 2

| Burn # | % of Total Mannequin Surface Reaching Criteria for 2nd & 3rd Degree Burn | | | % of Mannequin Surface Under Garment Reaching Criteria for 2nd & 3rd Degree Burn | | | After-flame (s) | Observations |
|---|---|---|---|---|---|---|---|---|
| | 2nd° | 3rd° | Total | 2nd° | 3rd° | Total | | |
| 4311[4] | 18.60 | 7.65 | 26.25 | 22.7 | 0.0 | 22.7 | <1.0 | Brief afterflame on right sleeve; heavy smoke; widespread discolouration, shrinking, and stiffening of fabric; charring of fabric on sleeves, legs, and back. |
| 4313[4] | 18.60 | 7.00 | 25.60 | 21.9 | 0.0 | 21.9 | - | No afterflame; heavy smoke; widespread discolouration, shrinking, and stiffening of fabric; charring of fabric on sleeves, legs, and back. |
| 4315[4] | 17.20 | 7.65 | 24.85 | 20.9 | 0.0 | 20.9 | - | No afterflame; heavy smoke; widespread discolouration, shrinking, and stiffening of fabric; charring of fabric on sleeves, legs, and back. |

PROTECTIVE FABRIC AND PROCESS OF MANUFACTURING SAME

The application claims the benefit of the filing date of U.S. Provisional Application No. 62/326,497, filed on Apr. 22, 2016, the disclosure of which is herein incorporated by reference in its entirety. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to a protective fabric and a process for producing the fabric. More particularly, the present invention relates to a protective fire resistant fabric and a process for producing the fabric from recycled garments.

BACKGROUND OF THE INVENTION

In the protective garment industry, fire resistant garments used in the oil and gas sector, among other industries, are frequently disposed of in large quantities. For example in Alberta, Canada, it is estimated that 1000 tons of fire resistant garments are disposed of each year. Aramids are estimated to comprise 500 tons of these disposed garments. Aramid fibers are a class of heat-resistant and strong synthetic fibers produced under trade names such as Nomex, Conex, Arawin, etc. The aramid fiber handles similarly to normal textile apparel fibers, and is characterized by excellent resistance to heat as it never melts or ignites at normal levels of oxygen. The U.S. Federal Trade Commission defines aramid fiber as a manufactured fiber in which the fiber-forming substance is a long-chain synthetic polyamide in which at least 85% of the amide linkages, (—CO—NH—) are attached directly to two aromatic rings. Disposal presents difficulties as the aramids contain benzene rings and should not be incinerated. Currently, disposal in landfills is the only option.

U.S. Pat. No. 7,065,950 to E.I. du Pont de Nemours and Company, herein expressly incorporated by reference, discloses a flame protective yarn, fabric, and garment that contain modacrylic, p-aramid, and m-aramid fibers. The yarn comprises 40 to 70 weight percent (wt %) modacrylic fiber, 5 to 20 wt % p-aramid fiber, and 10 to 40 wt % m-aramid fiber. The modacrylic fiber is an acrylic synthetic fiber made from a polymer comprised primarily of acrylonitrile. The polymer is a copolymer comprising 30 to 70 wt % of an acrylonitrile and 70 to 30 wt % of a halogen-containing vinyl monomer. The halogen-containing vinyl monomer is at least one monomer selected, for example, from: vinyl chloride, vinylidene chloride, vinyl bromide, and vinylidene bromide. Examples of copolymerizable vinyl monomers are: acrylic acid, methacrylic acid, salts or esters of such acids, acrylamide, methylacrylamide, and vinyl acetate. Additives can be used with the aramid and it has been found that up to as much as 10 wt % of other polymeric material can be blended with the aramid or that copolymers can be used having as much as 10 wt % of other diamine substituted for the diamine of the aramid or as much as 10 wt % of other diacid chloride substituted for the diacid chloride of the aramid. M-aramids are those aramids where the amide linkages are in the meta-position relative to each other, and p-aramids are those aramids where the amide linkages are in the para-position relative to each other. In the practice of this invention the aramids most often used are poly(paraphenylene terephthalamide) and poly(metaphenylene isophthalamide).

U.S. Pat. No. 7,744,999 to E.I. du Pont de Nemours and Company, herein expressly incorporated by reference, discloses a flame protective yarn, fabric, and garment that contain modacrylic, p-aramid, and m-aramid fibers. The yarn consists essentially: of from 50-80 wt % meta-aramid fiber having a degree of crystallinity of at least 20%, 10-30 wt % modacrylic fiber, 5-20 wt % para-aramid fiber, and 1-3 wt % antistatic fiber based on the total weight. The fabric has a basis weight in the range of 5.5 to 7 oz per square yard.

U.S. Pat. No. 8,069,643 to E.I. du Pont de Nemours and Company, herein expressly incorporated by reference, discloses a flame protective yarn, fabric, and garment comprising aramid fiber and modacrylic fiber wherein the modacrylic fiber has less than 1.5 wt % antimony. The fabric consists essentially of: 50-80 wt % meta-aramid fiber having a degree of crystallinity of at least 20%, 10-40 wt % modacrylic fiber that is antimony free, 5-20 wt % para-aramid fiber, and 1-3 wt % antistatic fiber based on the total weight. The fabric has a basis weight in the range of 4 to 12 oz per square yard.

U.S. Pat. No. 8,133,584 to E.I. du Pont de Nemours and Company, herein expressly incorporated by reference, discloses a flame protective yarn, fabric, and garment comprising aramid fiber and modacrylic fiber, wherein the modacrylic fiber has less than 1.5 wt % antimony. The fabric consists essentially: of 50-80 wt % meta-aramid fiber having a degree of crystallinity of at least 20%, 10-30 wt % flame-retardant rayon fiber, 10-20% wt modacrylic fiber, 0-5 wt % para-aramid fiber, and 0-3 wt % antistatic fiber based on the total weight. The fabric has a basis weight in the range of 5.5 to 7 oz per square yard.

U.S. Pat. No. 7,348,059 (a continuation-in-part of U.S. Pat. No. 7,065,950) to E.I. du Pont de Nemours and Company, herein expressly incorporated by reference, discloses a yarn comprising: 40 to 70 wt % modacrylic fiber, and 5 to 20 wt % p-aramid fiber having a degree of crystallinity of at least 20 wt %. The fabric has reduced shrinkage due to the crystalline nature compared to a fabric wherein the m-aramid fiber is amorphous.

Other techniques for protective garments, yarns, and fabrics are disclosed in U.S. Publication Nos. 2011/0173734 to Mikhail et al., 2012/0146784 to Hines et al., 2014/0041107 to Rose et al., and 2014/0196201 to Guangdong Kingtide Development Co., Ltd., all of which are herein expressly incorporated by reference.

All of these prior references described above do not disclose yarns, fabrics, and garments suitable for flame protection that use recycled components. It is an object of this invention to provide at least a novel and non-obvious method and fabric comprising at least recycled material from used yarns, fabrics, and garments to avoid sending them to landfills while maintaining properties suitable for use as protective garments.

SUMMARY OF THE INVENTION

According to one embodiment of the invention, there is provided a fabric for use in arc and flame protection comprising: at least 70 weight percent (wt %) aramid fiber, less than 40 wt % modacrylic, 8 wt % nylon and 2 wt % anti-static, said percentages on the basis of components (a), (b), (c), and (d). The at least 70 wt % aramid fiber may be 70 w % aramid fiber, and the less than 40 wt % modacrylic may be 20 wt % modacrylic. The warp may comprise ⅔ of the total weight of the fabric and the weft may comprise ⅓ of the total weight of the fabric. The warp may comprise 45 wt % aramids, 13 wt % modacrylic, 6.5 wt % nylon, and 0.65 wt % anti-static material. The warp aramids may further comprise 49 wt % virgin aramid fiber and 20 wt % recycled aramid fiber. The weft may comprise 26 wt % aramids, 7 wt % modacrylic, 2 wt % nylon, and 1.4 wt % anti-static material. The weft aramids may further comprise 55 wt % recycled aramid fiber and 18 wt % virgin aramid fiber. The fabric weight in some aspects may be between 6 to 7 oz twill.

According to another aspect of the invention, there is provided a warp for use in a fire resistant fabric comprising 69 wt % meta-aramids, 19 wt % modacrylic, 10 wt % nylon, and 2 wt % antistatic.

According to yet another aspect of the invention, there is provided a weft for use in a fire resistant fabric comprising 73 wt % meta-aramids, 20 wt % modacrylic, 5 wt % nylon, and 2 wt % anti-static.

According to yet another aspect of the invention, there is provided a process for producing a fire resistant fabric, comprising: shredding recycled fire resistant garments into fibers, creating yarn from the shredded fibers, weaving the yarn into fabric, and knitting the yarn to produce new garments. The process may further comprise dry cleaning the recycled garments using a chemical solvent prior to the shredding. The chemical solvent may be tetrachloroethylene. The process may further comprise removing non-fire resistant components from the recycled garments, prior to the shredding. The shredding may be done by an industrial fabric shredder. Creating the yarn may comprise carding the shredded fabric to produce a sliver. Creating the yarn may further comprise then feeding the sliver through a roving machine. The sliver may be twisted and elongated by the roving machine. The carding may be done by hundreds of wires in a carding machine. The weaving may be done using a loom.

BRIEF DESCRIPTION OF THE DRAWINGS

In the figures which illustrate by way of example only, embodiments of the present invention.

FIG. 2 shows test results for a 3-second exposure to flame test on blue standard coveralls made from 70% aramid, 20% modacrylic, 8% nylon, and 2% anti-static, tested with 100% cotton t-shirt and briefs;

FIG. 3 shows test results for a 5-second exposure to flame test on blue coveralls with visibility trim, double layer elbows and knees, made from 70% aramid, 20% modacrylic, 8% nylon, and 2% anti-static, tested with 100% cotton t-shirt and briefs;

DETAILED DESCRIPTION OF THE EMBODIMENT

Figure 1:
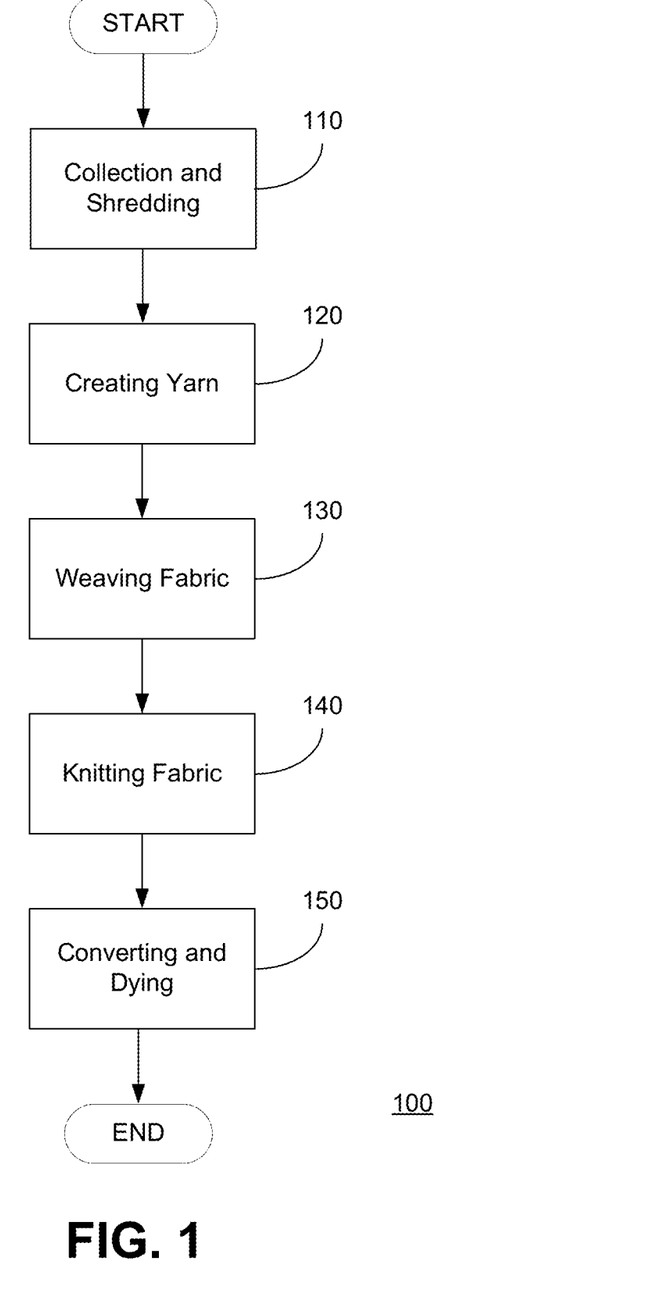
FIG. 1 depicts a process for producing fabric from recycled components.

A process 100 for producing a fire resistant fabric is shown at a high level in FIG. 1. The process begins with the collection and shredding 110 of used garments such as coveralls. The garments may initially have contaminants such as oil, dirt, etc. present thereon. These contaminants may be removed through dry cleaning using a chemical solvent such as tetrachloroethylene (perchloroethylene) commonly known as "PERC". The garments may then be processed by manually removing any non-fire resistant components such as zippers, snaps, hook and loop fasteners (e.g. Velcro®), etc. After removal of these non-fire resistant components, the garments are shredded by means of an industrial fabric shredder to produce recycled fibers.

At step 120, the recycled fibers are used to make yarn through carding by hundreds of fine wires in a carding machine, as is known in the art. The carding machine separates the fibers and produces a rope like strand of parallel fibers called a sliver. The sliver is fed through at least one roving machine, as is known in the art, where it is elongated and given additional twists to produce yarn.

At step 130, the yarn is woven into a fabric using a loom as is known in the art.

The fabric is then knitted at step 140, and then dyed and converted back into garments at step 150.

In the most preferred embodiment, the resulting fabric is 6 to 7 oz twill comprising: 70 wt % aramids; 20 wt % modacrylic; 8 wt % nylon; and 2 wt % anti-static material. The warp comprises approximately ⅔ of the total weight of the fabric whereas the weft comprises approximately ⅓ of the total weight of the fabric.

The warp is 45 wt % aramids, 13 wt % modacrylic, 6.5 wt % nylon, and 0.65 wt % anti-static material based on total fabric weight. For the warp aramids, 49 wt % are virgin aramid and 20% wt are recycled aramids based on the total fabric weight. Based on only the weight of the warp, the warp comprises 69 wt % meta-aramids, 19 wt % modacrylic, 10 wt % nylon, and 2 wt % anti-static.

The weft is 26 wt % aramids, 7 wt % modacrylic, 2 wt % nylon, and 1.4 wt % anti-static material based on total fabric weight. For the weft aramids, 55 wt % are recycled aramids and 18 wt % are virgin aramids based on total fabric weight. Based only on the weight of the weft, the weft comprises 73 wt % meta-aramids, 20 wt % modacrylic, 5 wt % nylon, and 2 wt % anti-static.

The Applicant has found that the resulting fabric produces unexpected and superior performance in mannequin burn tests. The garments were tested in accordance with ASTM F1930-15 *Standard Test Method for Evaluation of Flame Resistant Clothing for Protection Against Fire Simulations Using an Instrumented Manikin*. The test results were conducted by the Protective Clothing and Equipment Research Facility (PCERF) at the University of Alberta (reference number P23-009-13). Appendix A, herein incorporated by reference in its entirety. Two garment systems were evaluated by the tests:

1. Blue standard coveralls, GR 2015-TW-1, 70% aramid/20% modacrylic/8% nylon/2% anti-static, tested with 100% cotton t-shirt and briefs; and
2. Blue coveralls with visibility trim, double layer elbows and knees, GR 2015-TW-1, 70% aramid/20% modacrylic/8% nylon/2% anti-static, tested with 100% cotton t-shirt and briefs.

The test apparatus used comprised a thermally instrumented mannequin. Flash fires were produced with propane diffusion flames. One hundred and ten stimulant sensors were used to measure the rate of heat transfer to the mannequin. A computer controlled data acquisition system was used to run the test, record and store the data, calculate the extent and nature of the skin damage, and display the results. The sampling rate of the system was 1100 Hz.

The tests were conducted on Sep. 24, 2015. The exposure heat flux at the start of the test was 82.4 kW/m$^2$, and at the end was 80.7 kW/m$^2$. The test room temperature ranged from 15° C. to 22° C., and the relative humidity ranged between 40% and 50%. Sensor temperature measurements (data collection) were taken for 60 seconds during and after flame exposure. The specimen garments were laundered one time as per AATCC (Association of Textile, Apparel and Materials Professionals) method 135 91, V A iii), as described in ASTM F1930-15 paragraph 9.1.4, and conditioned at 21° C. and 65% relative humidity for a minimum of 24 hours after laundering. Garments were tested within 10 minutes of removal from the conditioned environment.

Figure 4A:
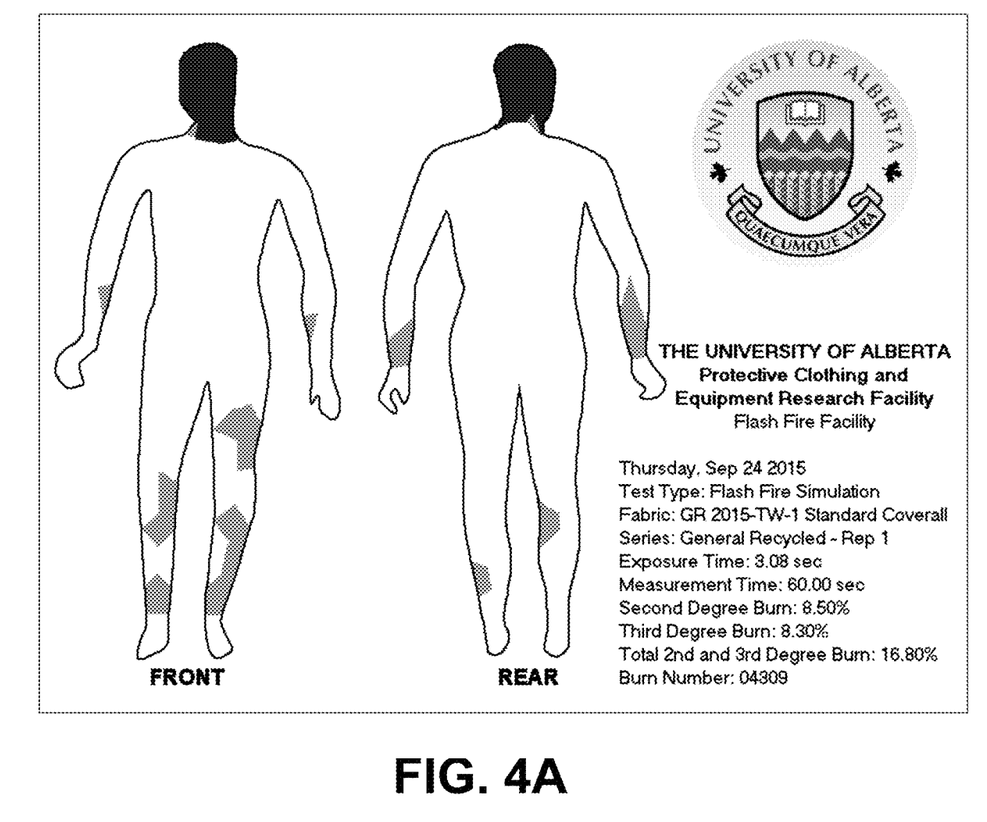
FIG. 4A shows detailed parameters and results of the 3-second test having burn number 4309 from FIG. 2.
Figure 4B:
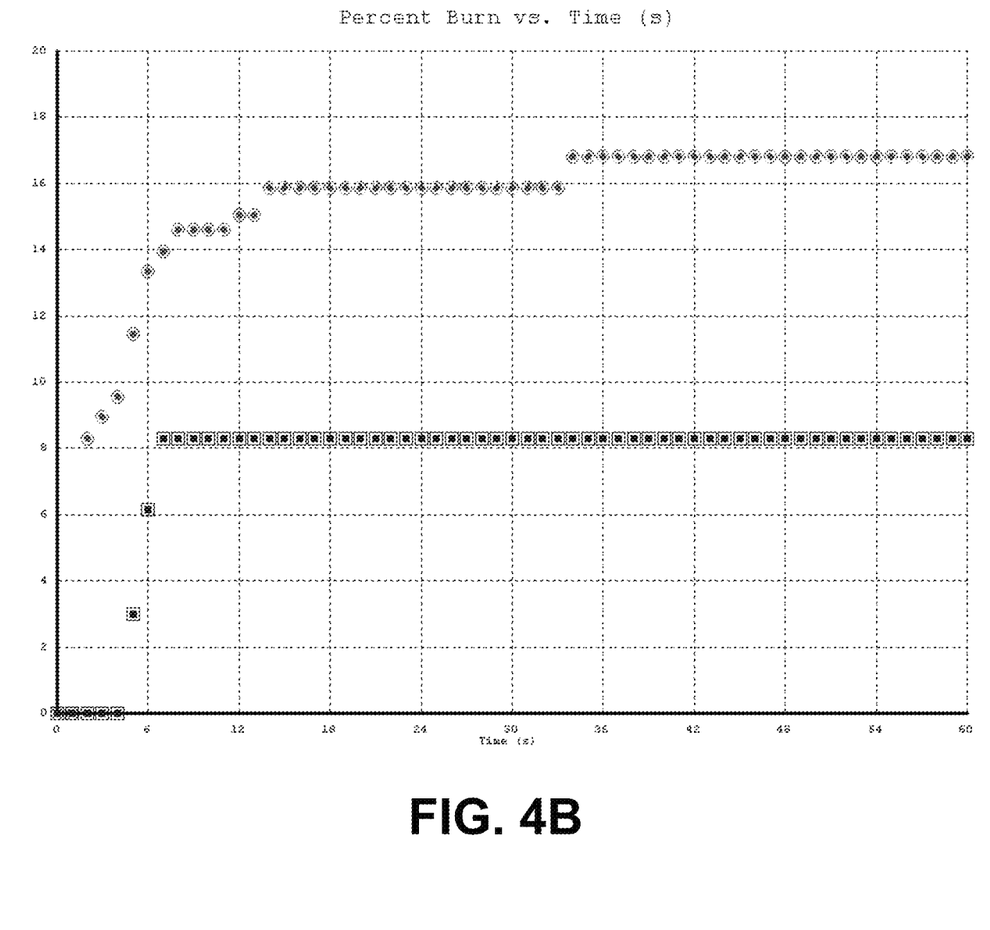
FIG. 4B is a graph depicting the percentage burn versus time for burn number 4309.
Figure 5A:
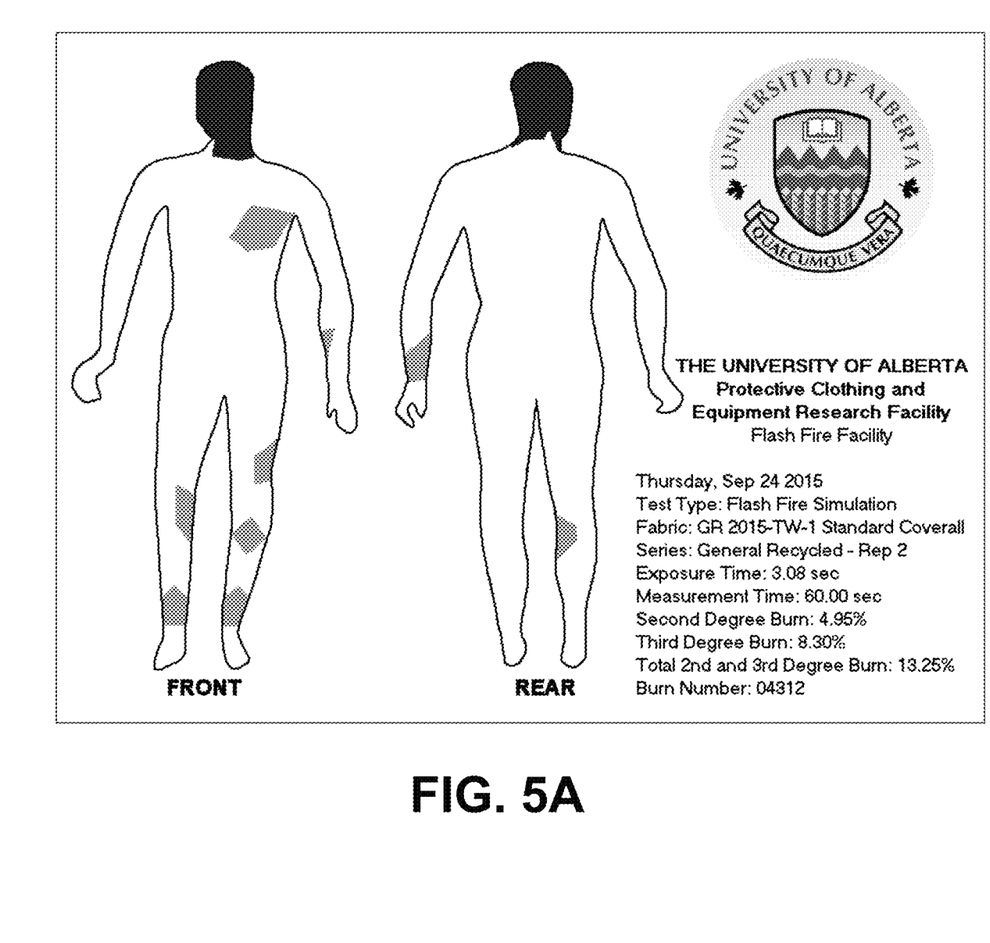
FIG. 5A shows detailed parameters and results of the 3-second test having burn number 4312 from FIG. 2.
Figure 5B:
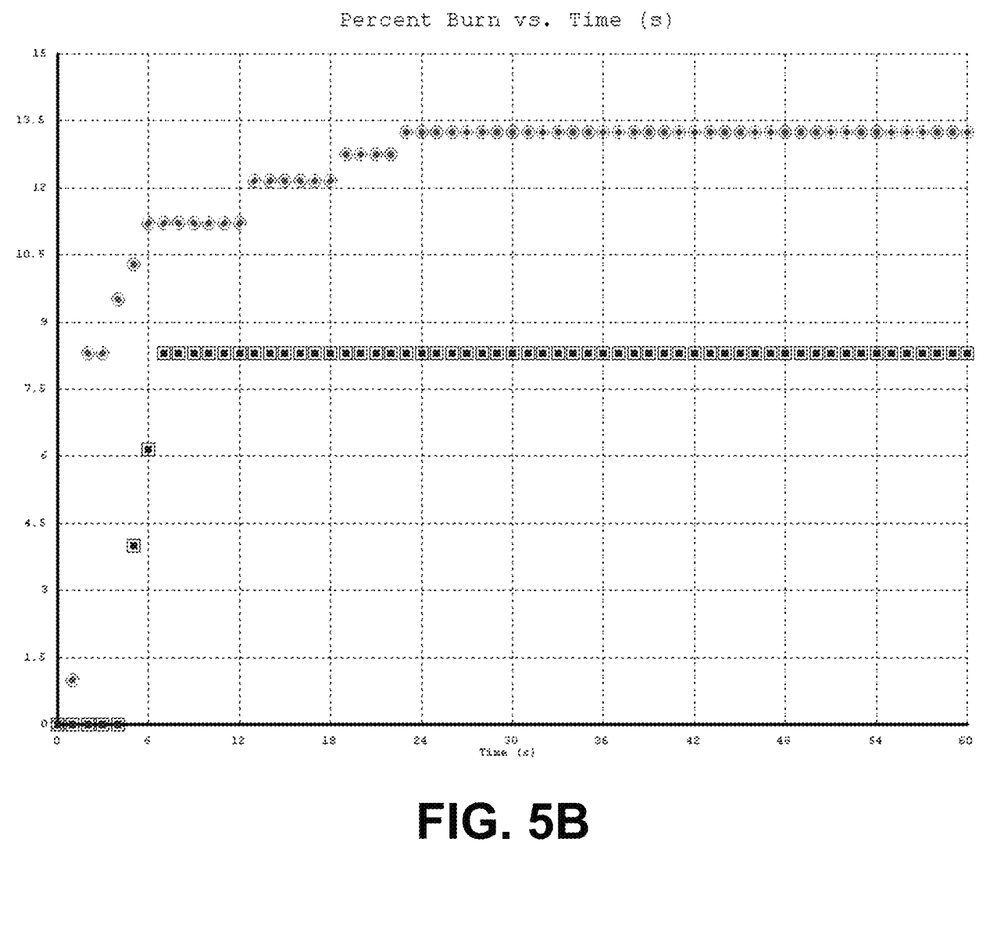
FIG. 5B is a graph depicting the percentage burn versus time for burn number 4312.
Figure 6A:
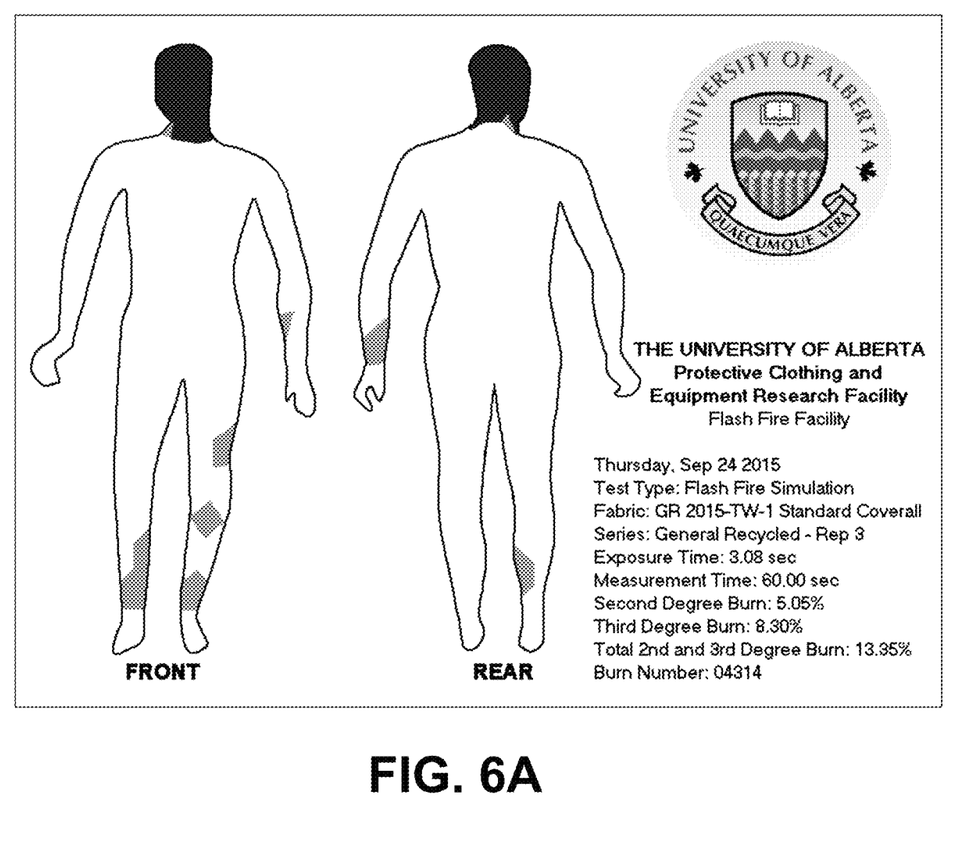
FIG. 6A shows detailed parameters and results of the 3-second test having burn number 4314 from FIG. 2.
Figure 6B:
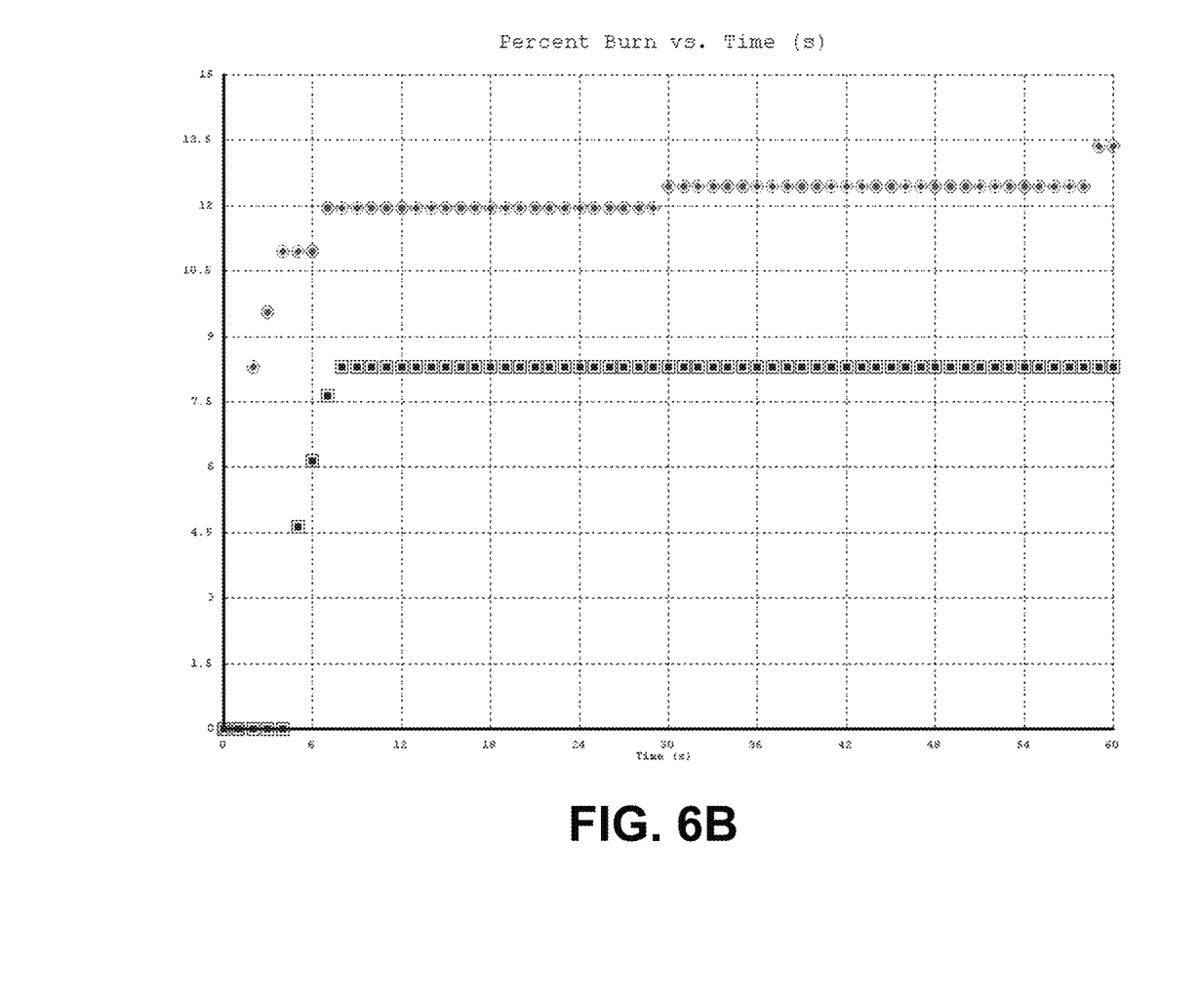
FIG. 6B is a graph depicting the percentage burn versus time for burn number 4314.

Tests performed on the first garment system (GR 2015-TW-1 Standard Coveralls) for a 3-second exposure resulted in 14.5% of the mannequin surface receiving 2$^{nd}$ and 3$^{rd}$ degree burns, and 7.3% of the mannequin surface under the garment receiving 2$^{nd}$ degree burns. These results were calculated as the mean of the burn predictions over three replications of the test. The three replications of the 3-second test are summarized in FIG. 2. More details of the test replications are provided in FIGS. 4A, 4B, 5A, 5B, 6A, and 6B. With reference to FIG. 2, it is clear that the garment protected the mannequin surface such that there were no (0%) 3$^{rd}$ degree burns, and only approximately 7.3% of the surface received 2$^{nd}$ degree burns. FIGS. 4A, 5A, and 6A show summarized test parameters and results for the three replications of the 3-second test. FIGS. 4B, 5B, and 6B are graphs depicting the percentage of total mannequin surface reaching criteria for 3$^{rd}$ degree burn (in square dots) as well as the percentage of total mannequin surface reaching criteria for 2$^{nd}$ and 3$^{rd}$ degree burn (in circular dots), versus time.

Figure 7A:
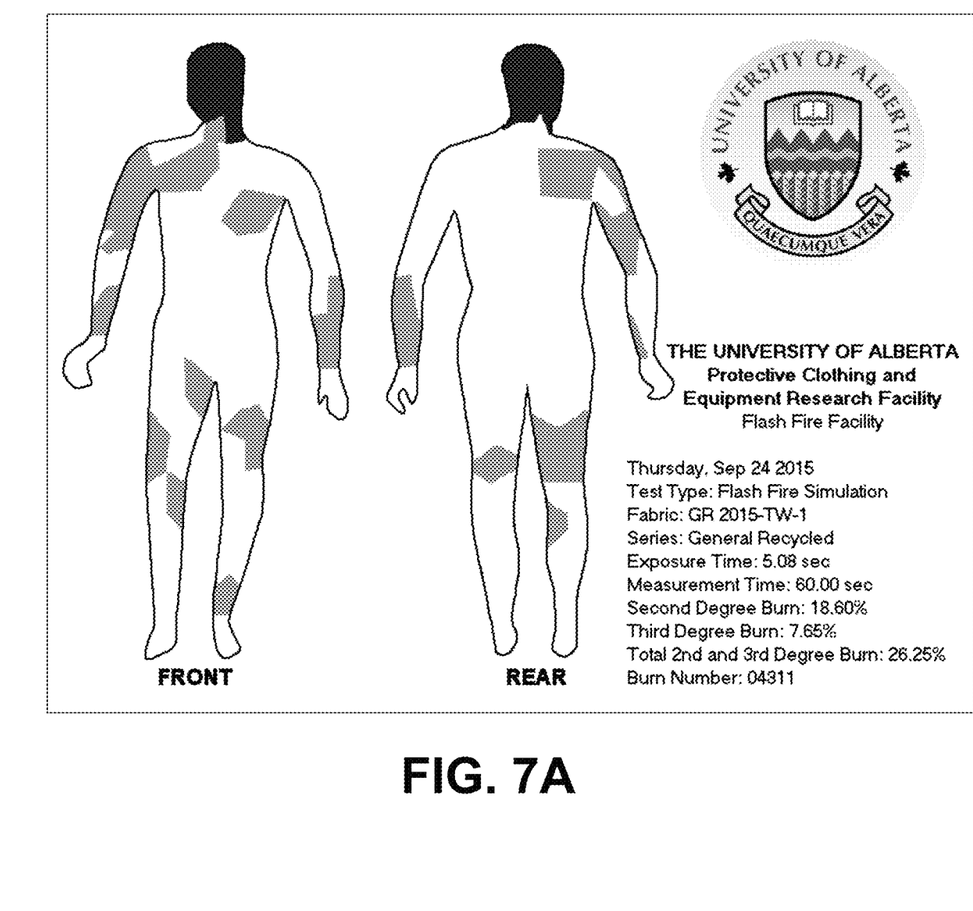
FIG. 7A shows detailed parameters and results of the 5-second test having burn number 4311 from FIG. 3.
Figure 7B:
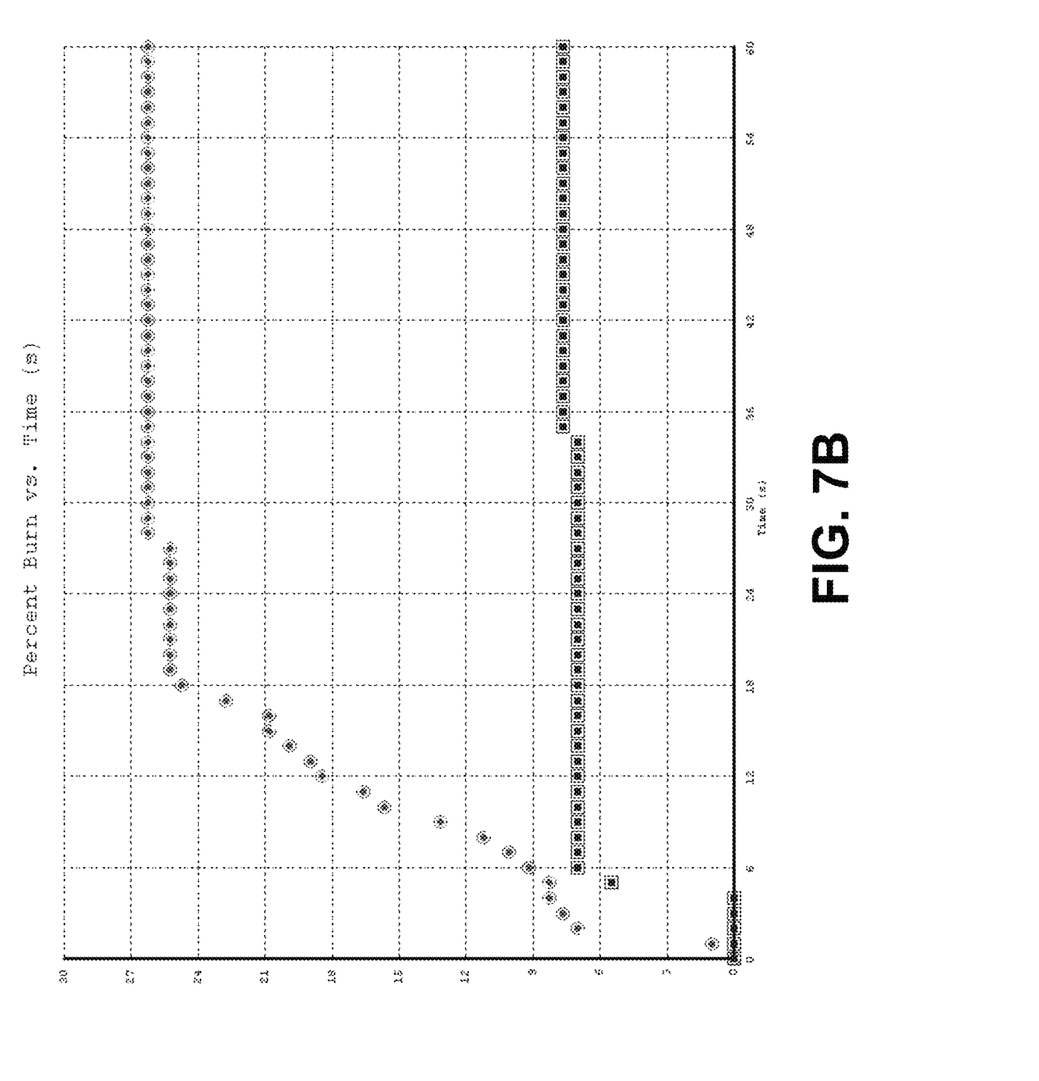
FIG. 7B is a graph depicting the percentage burn versus time for burn number 4311.
Figure 8A:
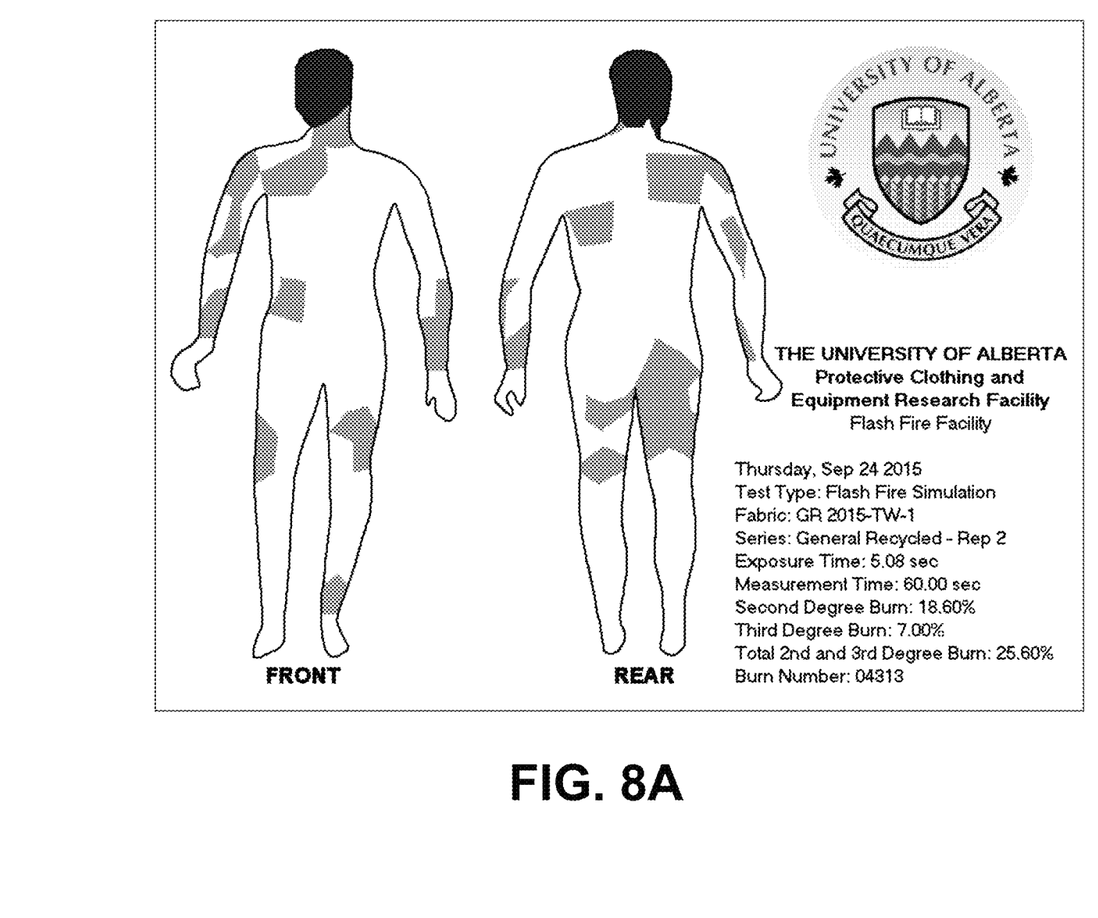
FIG. 8A shows detailed parameters and results of the 5-second test having burn number 4313 from FIG. 3.
Figure 8B:
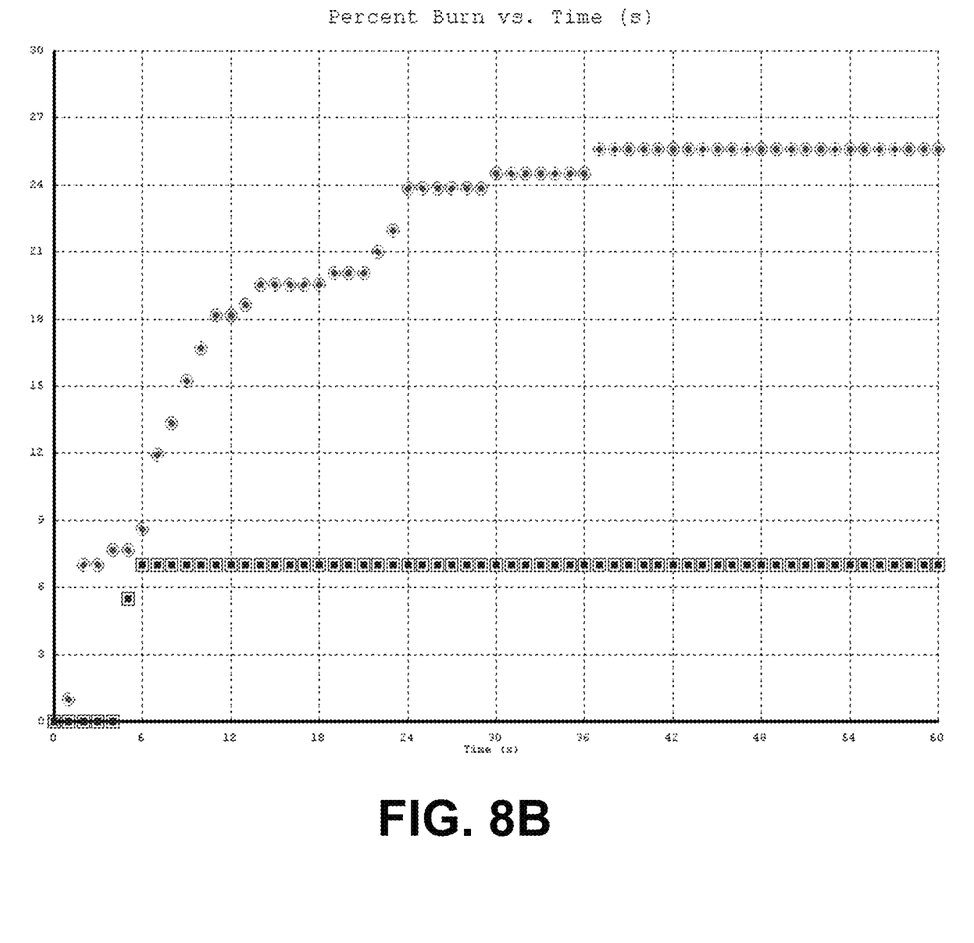
FIG. 8B is a graph depicting the percentage burn versus time for burn number 4313.
Figure 9A:
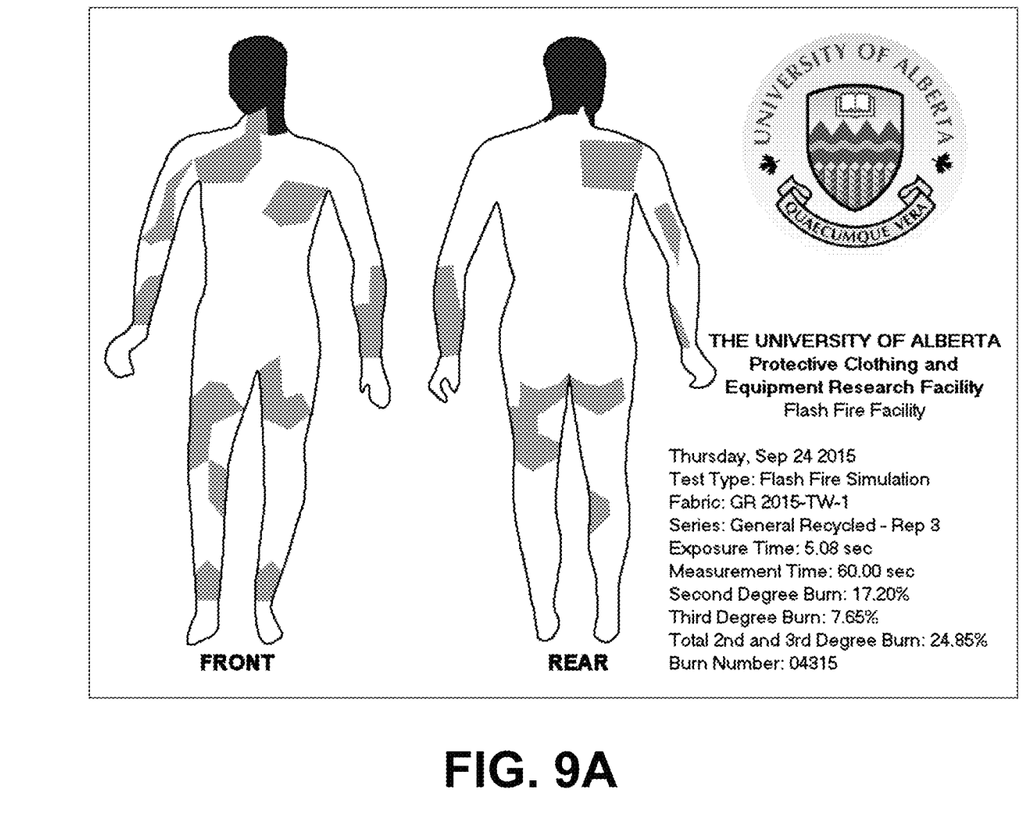
FIG. 9A shows detailed parameters and results of the 5-second test having burn number 4315 from FIG. 3.
Figure 9B:
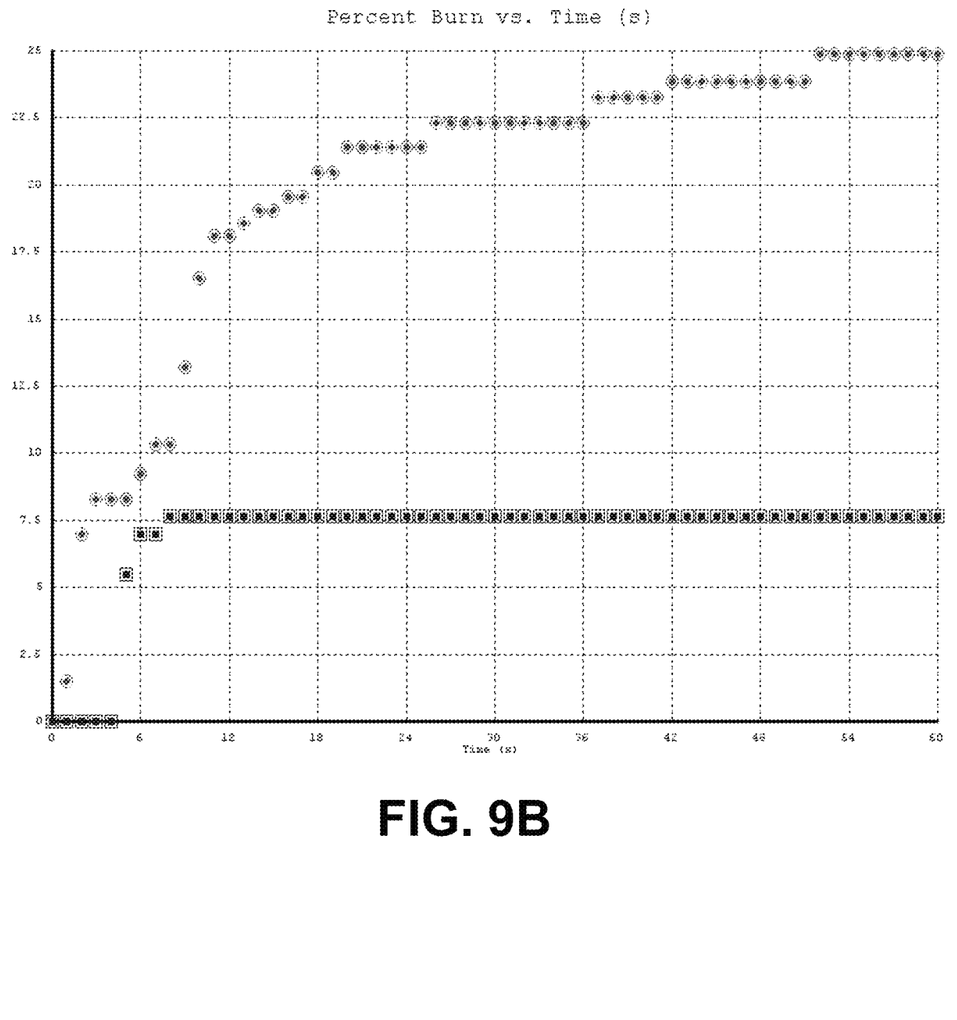
FIG. 9B is a graph depicting the percentage burn versus time for burn number 4315.

Tests performed on the second garment system (GR 2015-TW-1 Coveralls with visibility trim) for a 5-second exposure resulted in 25.6% of the mannequin surface receiving 2$^{nd}$ and 3$^{rd}$ degree burns, and 21.8% of the mannequin surface under the garment receiving 2$^{nd}$ degree burns. These results were calculated as the mean of the burn predictions over three replications of the test. The three replications of the 3-second test are summarized in FIG. 3. More details of the test replications are provided in FIGS. 7A, 7B, 8A, 8B, 9A, and 9B. With reference to FIG. 3, it is clear that the garment protected the mannequin surface such that there were no (0%) 3$^{rd}$ degree burns, and only approximately 21.8% of the surface received 2$^{nd}$ degree burns. FIGS. 7A, 8A, and 9A show summarized test parameters and results for the three replications of the 5-second test. FIGS. 7B, 8B, and 9B are graphs depicting the percentage of total mannequin surface reaching criteria for 3$^{rd}$ degree burn (in square dots) as well as the percentage of total mannequin surface reaching criteria for 2$^{nd}$ and 3$^{rd}$ degree burn (in circular dots), versus time.

Although the embodiments described herein demonstrate fabric of between 6 to 7 oz twill, other embodiments may be a fabric of between 5.25 to 8 oz twill.

Although the embodiments described herein demonstrate a particular process for making yarn and fabric, other processes may be used as is known in the art to produce fabric with similar characteristics as described herein.

The above-described embodiments are intended to be examples of the present invention and alterations and modifications may be effected thereto, by those of skill in the art, without departing from the scope of the invention, which is defined solely by the claims appended hereto.

What is claimed is:

1. A fabric for use in arc and flame protection comprising:
   approximately 70 weight percent (wt %) aramid fiber;
   approximately 20 wt % modacrylic;
   approximately 8 wt % nylon; and
   approximately 2 wt % anti-static;
   wherein the aramid fiber comprises recycled aramid fiber obtained from recycled fire resistant garments and virgin aramid fiber, and
   wherein a mannequin protected using said fabric experiences no third degree burns after a 3 to 5 second exposure to a heat flux of 82.4 kW/m$^2$.

2. The fabric according to claim 1, wherein the warp comprises ⅔ of the total weight of the fabric, and wherein the weft comprises ⅓ of the total weight of the fabric.

3. The fabric according to claim 1, wherein the warp comprises 45 wt % aramids, 13 wt % modacrylic, 6.5 wt % nylon, and 0.65 wt % anti-static material.

4. The fabric according to claim 3, wherein the warp aramids comprise 49 wt % virgin aramid fiber and 20 wt % recycled aramid fiber.

5. The fabric according to claim 1, wherein the weft comprises 26 wt % aramids, 7 wt % modacrylic, 2 wt % nylon, and 1.4 wt % anti-static material.

6. The fabric according to claim 5, wherein the weft aramids comprises 55 wt % recycled aramid fiber and 18 wt % virgin aramid fiber.

7. The fabric according to claim 1, wherein the fabric weight is between 6 to 7 oz per square yard.

* * * * *